United States Patent
Kim et al.

(10) Patent No.: US 11,506,940 B2
(45) Date of Patent: Nov. 22, 2022

(54) TRANSMITTANCE-VARIABLE DEVICE AND USE THEREOF

(71) Applicant: LG Chem, Ltd., Seoul (KR)

(72) Inventors: Jung Woon Kim, Daejeon (KR); Su Young Ryu, Daejeon (KR); Byoung Kun Jeon, Daejeon (KR); Yong Sung Choi, Daejeon (KR); Seong Min Lee, Daejeon (KR); Hye Min Yu, Daejeon (KR)

(73) Assignee: LG Chem, Ltd.

( * ) Notice: Subject to any disclaimer, the term of this patent is extended or adjusted under 35 U.S.C. 154(b) by 185 days.

(21) Appl. No.: 16/765,271

(22) PCT Filed: Nov. 28, 2018

(86) PCT No.: PCT/KR2018/014800
§ 371 (c)(1),
(2) Date: May 19, 2020

(87) PCT Pub. No.: WO2019/107906
PCT Pub. Date: Jun. 6, 2019

(65) Prior Publication Data
US 2020/0310185 A1    Oct. 1, 2020

(30) Foreign Application Priority Data

Nov. 28, 2017  (KR) .......... 10-2017-0160492

(51) Int. Cl.
*G02F 1/1339*    (2006.01)
*G02F 1/1335*    (2006.01)
(Continued)

(52) U.S. Cl.
CPC ........ *G02F 1/13394* (2013.01); *G02F 1/1337* (2013.01); *G02F 1/13475* (2013.01);
(Continued)

(58) Field of Classification Search
CPC .......... G02F 1/13394; G02F 1/133528; G02F 1/1337; G02F 1/13475; G02F 1/13398; G02F 1/133565
See application file for complete search history.

(56) References Cited

U.S. PATENT DOCUMENTS 3,900,248 A * 8/1975 Nagasaki ............ G02F 1/13725
349/81
4,966,442 A * 10/1990 Ono .................... G02F 1/13392
349/122
(Continued)

FOREIGN PATENT DOCUMENTS

EP       3385781 A1    10/2018
JP    2017097339 A     6/2017
(Continued)

OTHER PUBLICATIONS

International Search Report from Application No. PCT/KR2018/014800 dated Mar. 4, 2019, 2 pages.

*Primary Examiner* — Edward J Glick
*Assistant Examiner* — David Y Chung
(74) *Attorney, Agent, or Firm* — Lerner, David, Littenberg, Krumholz & Mentlik, LLP

(57) ABSTRACT

A transmittance-variable layer and a transmittance-variable device including the same are disclosed herein. In some embodiments, a transmittance-variable device includes a polarization layer and a transmittance-variable layer disposed on the polarization layer, wherein the transmittance-variable layer includes a first base layer disposed on the polarization layer and a spacer fixed on a surface of the first base layer opposite to the polarization layer, and a second base layer facing the first base layer and spaced apart from the first base layer by the first spacer, wherein the first spacer (Continued)

maintains a gap between the first and second base layers, and a first light modulating material disposed in the gap.

16 Claims, 7 Drawing Sheets

(51) Int. Cl.
*G02F 1/1337* (2006.01)
*G02F 1/1347* (2006.01)
(52) U.S. Cl.
CPC .... *G02F 1/133528* (2013.01); *G02F 1/13398* (2021.01); *G02F 1/133565* (2021.01)

(56) References Cited

U.S. PATENT DOCUMENTS

| | | | | |
|---|---|---|---|---|
| 5,338,240 | A | * | 8/1994 | Kim .................... G02F 1/13394 349/110 |
| 6,144,435 | A | * | 11/2000 | Yokoyama ........... G09G 3/3629 349/133 |
| 6,300,988 | B1 | * | 10/2001 | Ishihara ............ H01L 29/78696 349/43 |
| 8,780,313 | B2 | * | 7/2014 | Sung .................... G02F 1/13392 349/155 |
| 2005/0068629 | A1 | | 3/2005 | Fernando et al. |
| 2010/0045640 | A1 | * | 2/2010 | Park ...................... G09G 3/003 345/205 |
| 2012/0033288 | A1 | | 2/2012 | Lee et al. |
| 2012/0169950 | A1 | | 7/2012 | Tatzel et al. |
| 2018/0307077 | A1 | * | 10/2018 | Miura .................. E06B 3/6722 |
| 2019/0049641 | A1 | | 2/2019 | Oh et al. |
| 2019/0079327 | A1 | | 3/2019 | Kim et al. |

FOREIGN PATENT DOCUMENTS

| | | |
|---|---|---|
| JP | 2017207236 A | 11/2017 |
| KR | 20060087600 A | 8/2006 |
| KR | 101146674 B1 | 5/2012 |
| KR | 20130137668 A | 12/2013 |
| KR | 20150125051 A | 11/2015 |
| KR | 20170003266 A | 1/2017 |
| KR | 20170064744 A | 6/2017 |
| KR | 20170072573 A | 6/2017 |
| KR | 20170117893 A | 10/2017 |
| WO | 2017105051 A1 | 6/2017 |
| WO | 2017179940 A1 | 10/2017 |

* cited by examiner

US 11,506,940 B2

TRANSMITTANCE-VARIABLE DEVICE AND USE THEREOF

CROSS-REFERENCE TO RELATED APPLICATION(S)

The present application is a National Phase entry under 35 U.S.C. § 371 of International Application No. PCT/KR2018/014800, filed on Nov. 28, 2018, which claims priority from Korean Patent Application No. 10-2017-0160492, filed on Nov. 28, 2017, the disclosures of which are incorporated by reference herein.

TECHNICAL FIELD

The present application relates to a transmittance-variable device and a use thereof.

BACKGROUND ART

A transmittance-variable device may be equipped with spacers as a cell gap holding member for holding a cell gap between two substrates on which alignment films are coated. At this time, a technique of fixing the spacers to one of two substrates on which alignment films are coated is applied, where during forming a cell, spacer alignment defects occur due to an external force applied from the outside of the transmittance-variable device.

As a result, an indentation phenomenon occurs in the alignment film of the substrate on which the spacer is not fixed, orientation defects are caused and light leakage is induced. Furthermore, when heat treatment is performed in a preconditioning process after manufacturing the cell, the deformation of the two substrates induces scratches on the alignment film formed on the substrate to which the spacer is not fixed. Such light leakage and scratches can be visually recognized if their size is large, which may induce a problem such as yield reduction.

EXPLANATION OF REFERENCE NUMERALS

Figure 1:
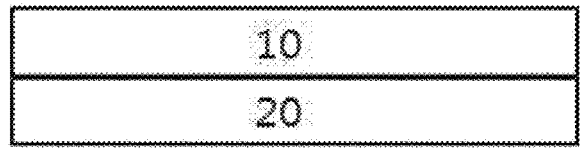
FIG. 1 is a diagram showing an illustrative transmittance-variable devices according to the present disclosure.

10: transmittance-variable layer
20: polarization layer
101: first base layer
102: alignment film
103: alignment film
104: second base layer
105: light modulating material
BS: ball spacer
CS: column spacer

DISCLOSURE

Technical Problem

The present application relates to a transmittance-variable device and a use thereof. It is one object of the present invention to provide a transmittance-variable device which can prevent scratches, orientation defects and light leakage of an alignment film generated during a cell manufacturing process, and can improve transmittance, haze and yield, and a use thereof.

Technical Solution

Figure 6:
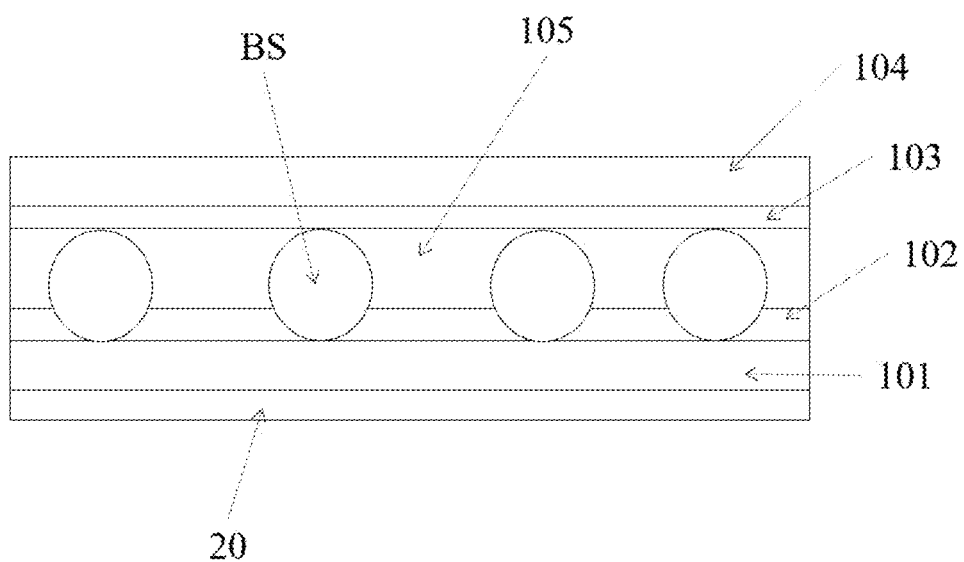
FIG. 6 is a diagram showing an illustrative transmittance-variable devices according to the present disclosure.
Figure 7:
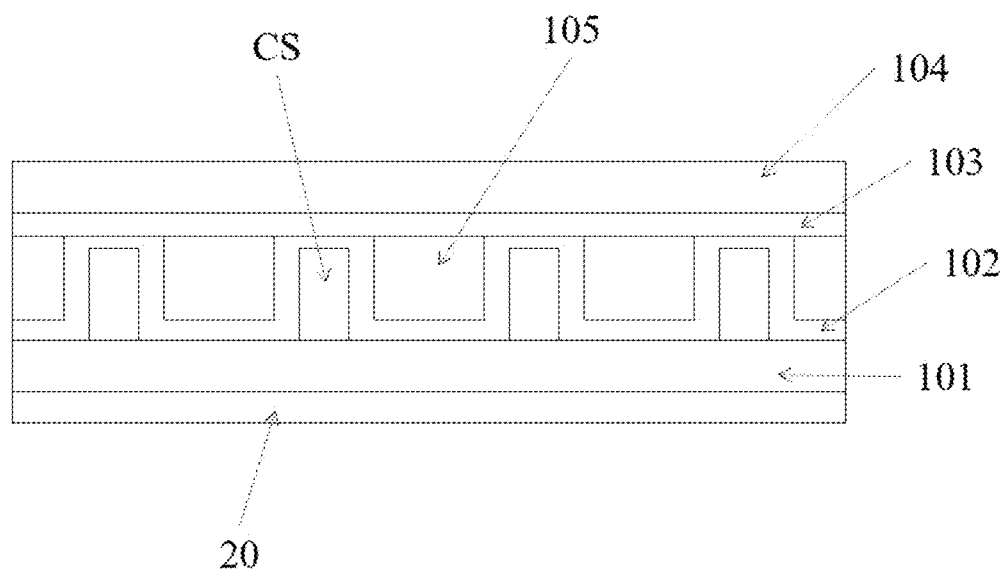
FIG. 7 is a diagram showing an illustrative transmittance-variable devices according to the present disclosure.

The present application relates to a transmittance-variable device. As shown in FIGS. 1, 6 and 7, an exemplary transmittance-variable device of the present application comprises a polarization layer 20 and a transmittance-variable layer 10, where the transmittance-variable layer 10 may comprise a first base layer 101 formed on the polarization layer 20; a spacer, a ball spacer (BS) and/or a column spacer (CS) fixed on the surface of the first base 101 layer opposite to the polarization layer 20; a second base layer 104 disposed opposite to the first base layer 101 and spaced apart from the first base layer 101 by the spacer BS and/or CS, and a light modulating material 105 existing in a gap between the first base layer 101 and second base layer 104.

The present application relates to a transmittance-variable device. FIG. 1 is a diagram showing a transmittance-variable device according to the present application. The transmittance-variable device of the present application may comprise a polarization layer (20) and a transmittance-variable layer (10).

The polarization layer (20) may comprise a passive polarization layer or an active polarization layer. The passive polarization layer may mean a functional layer that exhibits selective transmission, polarization, blocking, reflection, scattering, refraction and/or absorption characteristics for incident light. In the case of the passive polarization layer, such selective transmission, polarization, blocking, reflection or absorption characteristics cannot be altered or eliminated by external action. The passive polarization layer may have, for example, a function of transmitting the light that vibrates in one direction from the incident light that vibrates in various directions and shielding the light that vibrates in the other directions. The type of the passive polarization layer is not particularly limited, and for example, as a reflective polarization layer, for example, a DBEF (dual brightness enhancement film), a lyotropic liquid crystal layer (LLC layer) or a wire grid polarizer and the like can be used, and as an absorptive polarization layer, for example, a known linear polarizer, such as a polarizer in which iodine is dyed on a polymer stretched film such as a PVA stretched film or a guest-host type polarizer, in which liquid crystals polymerized in an oriented state are used as a host and an anisotropic dye arranged in accordance with the orientation of the liquid crystals is used as a guest, and the like can be used, without being limited thereto.

The active polarization layer is also a functional layer exhibiting selective transmission, polarization, blocking, reflection, scattering, refraction and/or absorption characteristics for incident light, where it is different from the passive polarization layer in that it may be a layer in which such selective transmission, blocking, polarization or absorption characteristics can be altered or eliminated by external action (for example, application of an electric field or the like). Here, the alteration also includes a change of the transmittance in the same transmission characteristic, or changes to other forms within the same characteristics such as a change of the polarization state in the same polarization characteristic.

The active polarization layer may mean a light modulation liquid crystal layer having a characteristic in which the orientation of a liquid crystal compound and/or an anisotropic dye present in a light modulating material layer may be adjusted to control anisotropic light absorption for the polarized light in a direction parallel to the alignment direction of the anisotropic dye and the polarized light in the vertical direction.

The active polarization layer may comprise a third base layer, a fourth base layer disposed opposite to the third base layer, a spacer maintaining a gap between the third base layer and the fourth base layer and a light modulating material existing between the third and fourth base layers. The spacer is fixed on the third base layer and the third base layer of the third base layer and the fourth base layer may be disposed close to the first base layer. The spacer may be a column spacer formed on the third base layer.

As shown in FIGS. 6 and 7, the transmittance-variable layer (10) may comprise a spacer BS and/or CS fixed on the surface of the first base layer 101 opposite to the polarization layer 20; a second base layer 104 disposed opposite to the first base layer 101 and spaced apart from the first base layer 101 by the spacer BS and/or CS, and a light modulating material 105 existing in a gap between the first base layer 101 and the second base layer 104. As shown in FIG. 7, the spacer may be a column spacer CS formed on the surface of the first base layer 101.

Here, as the base layer, any base layer used as a substrate in a constitution of a known optical device such as, for example, a liquid crystal display (LCD) can be applied, without particular limitation. For example, the base layer may be an inorganic base layer or an organic base layer. As the inorganic base layer, a glass base layer and the like can be exemplified, and as the organic base layer, various plastic films and the like can be exemplified. The plastic film can be exemplified by a TAC (triacetyl cellulose) film; a COP (cycloolefin copolymer) film such as norbornene derivatives; an acrylic film such as PMMA (poly(methyl methacrylate)); a PC (polycarbonate) film; a polyolefin film such as PE (polyethylene) or PP (polypropylene); a PVA (polyvinyl alcohol) films; a DAC (diacetyl cellulose) film; a Pac (polyacrylate) film; a PES (poly ether sulfone) film; a PEEK (polyetheretherketone) film; a PPS (polyphenylsulfone) film, a PEI (polyetherimide) film; a PEN (polyethylenemaphthatate) film; a PET (polyethyleneterephtalate) film; a PI (polyimide) film; a PSF (polysulfone) film or a PAR (polyarylate) film, and the like, but is not limited thereto.

In the present application, the thickness of the base layer is also not particularly limited, and an appropriate range may be selected depending on the application.

As shown in FIGS. 6 and 7, a spacer BS adhered to the surface of the first base layer 101 opposite to the polarization layer 20 or a column spacer CS adhered on surface of the first base layer 101 opposite to the polarization layer 20 may be included. An alignment film 102 may be further included on the surface of the first base layer 101 on which the spacer BS is formed, where the spacer BS may be embedded in the alignment film 102 and fixed, or a curing resin film existing on the surface of the first base layer 101 on which the spacer is formed may be further included, where the spacer BS may be embedded in the curing resin film and fixed. In this specification, the fact that a spacer is fixed to an alignment film means that a spacer is stuck to an alignment film.

Specifically, in this specification, the fact that a spacer is fixed to an alignment film has a different meaning from the fact that a spacer simply contacts an alignment film, which may mean a state where a spacer is fixed on one side of an alignment film, so that there is no movement due to external force or pressure. It can be confirmed, for example, by determining which alignment film the spacer remains when the liquid crystal cell is decomposed, whether or not the spacer is fixed to the alignment film.

The spacer may include a ball spacer or a column spacer, but is not limited thereto. The material constituting the spacer can be appropriately selected in consideration of the object of the present application. For example, the spacer may comprise one or more selected from the group consisting of a carbon-based material, a metal-based material, an oxide-based material, and a composite material thereof. When the spacer is made of the above material, it is suitable for realizing the transmittance-variable device.

In this specification, the fact that a spacer is fixed to an alignment film or a curing resin film formed on a first base layer means that a spacer is stuck to the alignment film or curing resin film. Specifically, in this specification, the fact that a spacer is fixed to the alignment film or curing resin film has a different meaning from the fact that a spacer simply contacts the alignment film or curing resin film, which may mean a state where a spacer is embedded in the alignment film or curing resin film, so that there is no movement due to external force or pressure.

The curing resin may comprise a curable material. As the curable material, a heat curable material or a photocurable material may be used. As the photocurable material, an ultraviolet curable material may be used. As the heat curable material, for example, a silicone resin, a silicon resin, a furan resin, a polyurethane resin, an epoxy resin, an amino resin, a phenol resin, a urea resin, a polyester resin or a melamine resin and the like may be used. As the ultraviolet curable material, typically, an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer and the like may be used.

The column spacer may be formed by applying a photosensitive resin composition to a base layer and then drying it to form a resin film, and exposing the resin film using two or more masks having different transmittance or using a mask having two or more regions with different transmittance.

The photosensitive resin composition may comprise a colorant, a binder resin, a photopolymerizable compound, a photopolymerization initiator, and a solvent, but is not limited thereto.

The colorant may comprise a black pigment and, if necessary, an organic or inorganic pigment.

The black pigment can be used without limitation as long as it has light-shielding properties against visible light rays, and for example, carbon black, aniline black, phenylene black or the like can be used. Such a black pigment may be used alone or in combination with an organic or inorganic pigment. As the organic or inorganic pigment, one or more of inorganic pigments and organic pigments known in the art can be further used. Particularly, the organic pigment and inorganic pigment may include, specifically, compounds classified into pigments in the Color Index (published by the Society of Dyers and Colourists), and more specifically, may include pigments having the following color index (C.I.) numbers, but are not always limited thereto.

The binder resin usually makes the unexposed portion of the colored photosensitive resin layer alkali-soluble and acts as a dispersing medium for a colorant. As the binder resin contained in the colored photosensitive resin composition of the present application, any binder resin that acts as a binder resin for the above-mentioned colorant and is soluble in an alkaline developer, can be used.

The binder resin may include, for example, a copolymer of a carboxyl group-containing monomer and another monomer copolymerizable with the monomer, or the like. The carboxyl group-containing monomer may include, for example, an unsaturated carboxylic acid, such as an unsaturated monocarboxylic acid or an unsaturated polyvalent carboxylic acid having one or more carboxyl groups in the molecule such as an unsaturated dicarboxylic acid and an unsaturated tricarboxylic acid, and the like.

The photopolymerizable compound is a compound that can be polymerized by the action of light and a photopolymerization initiator to be described below, which can be used without limitation as long as it contains an unsaturated group and has photosensitivity, and include monofunctional monomers, bifunctional monomers, other multifunctional monomers, and the like.

A specific example of the monofunctional monomer may include nonylphenylcarbitol acrylate, 2-hydroxy-3-phenoxypropyl acrylate, 2-ethylhexylcarbitol acrylate, 2-hydroxyethyl acrylate, N-vinyl Pyrrolidone, and the like, but is not limited thereto.

A specific example of the bifunctional monomer may include 1,6-hexanediol di(meth)acrylate, ethylene glycol di(meth)acrylate, neopentyl glycol di(meth)acrylate, triethylene glycol di(meth)acrylate, bis(acryloyloxyethyl) ether of bisphenol A, 3-methylpentanediol di(meth)acrylate, and the like, but is not limited thereto.

A specific example of the other polyfunctional monomer may include trimethylolpropane tri(meth)acrylate, pentaerythritol tri(meth)acrylate, pentaerythritol tetra(meth) acrylate, pentaerythritol penta(meth)acrylate, dipentaerythritol hexa(meth)acrylate, and the like, but is not limited thereto. Among these, polyfunctional monomers having bifunctionality or more are preferably used.

The photopolymerization initiator can be used without limitation as long as it is generally used in a photosensitive resin composition, and for example, one or more can be selected from 1-acetophenone-based, benzophenone-based, triazine-based, thioxanthone-based, oxime-based, benzoin-based, biimidazole-based compounds, and used, but is not limited thereto.

The solvent is not particularly limited as long as it is effective in dispersing and dissolving the components contained in the colored photosensitive resin composition, and various organic solvents used in the field of the colored photosensitive resin composition can be used.

A specific example of the solvent may include ethylene glycol monoalkyl ethers such as ethylene glycol monomethyl ether, ethylene glycol monoethyl ether, ethylene glycol monopropyl ether and ethylene glycol monobutyl ether; diethylene glycol dialkyl ethers such as diethylene glycol dimethyl ether, diethylene glycol diethyl ether, diethylene glycol dipropyl ether and diethylene glycol dibutyl ether; ethylene glycol alkyl ether acetates such as methyl cellosolve acetate and ethyl cellosolve acetate; alkylene glycol alkyl ether acetates such as propylene glycol monomethyl ether acetate, propylene glycol monoethyl ether acetate, propylene glycol monopropyl ether acetate, methoxybutyl acetate and methoxypentyl acetate; aromatic hydrocarbons such as benzene, toluene, xylene and mesitylene; ketones such as methyl ethyl ketone, acetone, methyl amyl ketone, methyl isobutyl ketone and cyclohexanone; alcohols such as ethanol, propanol, butanol, hexanol, cyclohexanol, ethylene glycol and glycerin; esters such as ethyl 3-ethoxypropionate and methyl 3-methoxypropionate; and cyclic esters such as γ-butyrolactone, and the like, but is not limited thereto. These solvents may be used alone or in combination of two or more.

The size of the spacer can be appropriately selected in consideration of the object of the present application. For example, the size of the spacer may be 2 µm to 100 µm, more specifically 8 µm to 30 µm. In the case of a ball spacer, the size of the spacer may mean the diameter of the ball spacer, and in the case of a column spacer, when the size of the spacer is in the above range, it may mean a height capable of keeping a cell gap between a first base layer and a second base layer constant.

In the transmittance-variable device of the present application, alignment films 102 and 103 may be formed on the first base layer 101 and the second base layer 104, respectively as shown in FIGS. 6 and 7. The kind of the alignment film used in the present application is not particularly limited, and a known alignment film can be used. For example, all the known alignment films can be applied, which satisfy appropriate coating properties, solubility in solvents, heat resistance, chemical resistance, durability against orientation treatment such as rubbing, and the like, exhibit appropriate tilting characteristics when necessary, and satisfy physical properties such as an appropriate voltage holding ratio (VHR) and a high contrast ratio through impurity management. The alignment film may be, for example, a vertical or horizontal alignment film. As the vertical or horizontal alignment film, any alignment film having vertical or horizontal alignment capability with respect to the liquid crystal compound of the adjacent liquid crystal layer can be selected and used without any particular limitation. As such an alignment film, for example, a contact type alignment film such as a rubbing alignment film or an alignment film including a photo-alignment film compound and known to be capable of exhibiting orientation characteristics by a non-contact method such as irradiation of linearly polarized light can be used.

The alignment film may be produced by applying, as an alignment film forming material comprising an alignment film forming substance, for example, the alignment film forming material prepared by dispersing, diluting and/or dissolving the alignment film forming substance in an appropriate solvent.

Here, as the kind of the alignment film forming substance, any kind of substance known to be capable of exhibiting orientation capability such as vertical or horizontal orientation capability with respect to liquid crystals by appropriate treatment can be used. Such a substance can be exemplified by a substance known to exhibit orientation capability by rubbing orientation, such as a polyimide compound, a polyvinyl alcohol compound, a polyamic acid compound, a polystyrene compound, a polyamide compound and a polyoxyethylene compound, or a substance known to be capable of exhibiting orientation capability by light irradiation, such as a polyimide compound, a polyamic acid compound, a polynorbornene compound, a phenylmaleimide copolymer, a polyvinylcinnamate compound, a polyazobenzene compound, a polyethyleneimide compound, a polyvinyl alcohol compound, a polyamide compound, a polyethylene compound, a polystyrene compound, a polyphenylenephthalamide compound, a polyester compound, a CMPI (chloromethylated polyimide) compound, a PVCI (polyvinylcinnamate) compound and a polymethyl methacrylate compound, and the like. In the present application, since it is required to adjust the polarity of the alignment film to a predetermined range as described below, it may be required to select a substance which is advantageous for exhibiting the polarity in a range to described below among the above-mentioned known substances, but basically, the alignment film forming substance used in the present application is not particularly limited because the polarity can also be controlled by the concentration of the alignment film forming substance to be described below.

The alignment film forming material can be prepared by diluting, dispersing and/or dissolving the alignment film forming substance as described above in a solvent. At this time, basically, the applicable solvent is not particularly limited. For example, as the solvent, any one selected from cycloalkanes having 3 to 12 carbon atoms or 3 to 8 carbon atoms such as cyclohexane, DMSO (dimethyl sulfoxide), THF (tetrahydrofuran), DMF (dimethylformamide), NMP (N-methyl-pyrrolidone), chloroform (CHCl3), ketone solvents such as gamma-butyrolactone or cyclopentanone, alcohols such as 2-butoxyethanol, or glycols such as ethylene glycol, or a mixed solvent of two or more selected from the foregoing can be applied.

In the present application, the alignment film is formed using such an alignment film forming material, where the forming method is not particularly limited. For example, the alignment film forming process may comprise a process of forming a layer of an alignment film forming material on the base layer and performing a known process such as the above orientation treatment on the formed layer. In addition, after forming the layer of the alignment film forming material by application or the like, the preconditioning process such as a drying process may also be performed when the time until calcination is not constant for each substrate or when the calcination is not immediately after the application. For example, the drying and/or heat treatment processes may be carried out using a suitable drier, oven or hot plate and the like.

Here, when the heat treatment and/or drying processes are performed, the treatment temperature or time is not particularly limited, which can be appropriately adjusted. For example, the process may be performed at a temperature of about 50° C. or more, about 60° C. or more, about 70° C. or more, about 80° C. or more, about 90° C. or more, about 100° C. or more, about 110° C. or more, or 120° C. or more. Also, the temperature may be about 300° C. or less, about 280° C. or less, about 260° C. or less, about 240° C. or less, about 230° C. or less, about 220° C. or less, about 210° C. or less, about 200° C. or less, about 180° C. or less, or about 160° C. or less.

The treatment temperature of the above process may also be selected in consideration of the state of the alignment film forming material or the above temperature and the like, and for example, the appropriate time may be selected in a range of about 1 minute to 2 hours.

In the manufacturing method of the present application, a step of performing orientation treatment on the formed alignment film (layer of alignment film forming material) may be further performed. In this case, the orientation treatment can be performed in a known manner. For example, in the case of a rubbing alignment film, the appropriate rubbing treatment may be performed or in the case of a photo-alignment film, the orientation treatment may be performed through the appropriate light irradiation treatment. The specific manner of performing each treatment is not particularly limited, where for example, as the rubbing process, a method using a rubbing cloth such as cotton, rayon or nylon can be applied, and as the light irradiation process, a method of irradiating it with suitable linearly polarized light or the like can be applied.

The light modulating material of the transmittance-variable device of the present application may comprise a liquid crystal compound and a dichroic dye. The orientation in the liquid crystal layer may be present in a state where the orientation is switchable. In this specification, the fact that the orientation is switchable may mean that the alignment direction of the liquid crystal compound can be changed by external action such as voltage application. As the liquid crystal compound, for example, a smectic liquid crystal compound, a nematic liquid crystal compound or a cholesteric liquid crystal compound and the like can be used. In addition, as the liquid crystal compound, a liquid crystal compound, which does not have any polymerizable group or crosslinkable group so that the orientation is changed under external action such as a voltage from outside, can be used.

The dichroic dyes can be classified into two types, which may mean, as molecules absorbing more light in a specific direction than in the other directions, a positive dichroic dye or a p-type dye, which is a dye absorbing the polarized light in the long axis direction of the molecule, and a negative dichroic dye or an n-type dye, which is a dye absorbing light in the vertical direction. Generally, such a dye may have an absorption spectrum in a narrow region around a wavelength causing maximum absorption. In addition, the dyes used in the guest host LCD can be evaluated by chemical and optical stability, colors and absorption spectrum widths, dichroic ratios, degrees of pigment order, solubility in hosts, degrees of nonionization, extinction coefficients and purity, and characteristics such as specific resistance. Hereinafter, the dichroic dye is assumed to be a positive dye, unless otherwise stated.

In this specification, the term "dye" may mean a material capable of intensively absorbing and/or modifying light in at least some or the entire range within a visible light region, for example, a wavelength range of 400 nm to 700 nm, and the term "dichroic dye" may mean a material capable of dichroic absorption of light in at least some or the entire range of the visible light region.

As the dichroic dye, for example, a known dye known to have properties that can be aligned according to the alignment state of the liquid crystals can be selected and used. As the dichroic dye, for example, a black dye can be used. Such a dye is known, for example, as an azo dye or an anthraquinone dye, but is not limited thereto.

The dichroic ratio of the dichroic dye can be appropriately selected in consideration of the object of the present application. For example, the dichroic dye may have a dichroic ratio of 5 or more to 20 or less. In this specification, the term "dichroic ratio" may mean, for example, in the case of a p-type dye, a value obtained by dividing the absorption of the polarized light parallel to the long axis direction of the dye by the absorption of the polarized light parallel to the direction perpendicular to the long axis direction. The anisotropic dye may have the dichroic ratio at at least some wavelengths or any wavelength within the wavelength range of the visible light region, for example, within the wavelength range of about 380 nm to 700 nm or about 400 nm to 700 nm.

The light modulating material of the active polarization layer in the transmittance-variable device of the present application may comprise a liquid crystal compound and a dichroic dye. The contents overlapping with those described in the light modulating material will be omitted.

The present application may also relate to a method for manufacturing such a transmittance-variable device. The manufacturing method may comprise steps of forming a transmittance-variable layer by disposing oppositely a first base layer on which a spacer is fixed or a column spacer is formed on one surface and a second base layer so that a light modulating material exists between the first and second base layers and the spacer of the first base layer faces the second base layer; and forming a polarization layer on the surface of the first base layer where no spacer is formed. Here the forming step may be a step of disposing the polarization layer so as to be adjacent to the first base layer as compared with the second base layer or may be a step of attaching the polarization layer to the surface of the first base layer where no spacer is formed. In addition, here, the second base layer may be a base layer where no spacer is formed.

The details of the polarization layer, the first and second base layers and the light modulating material are the same as those described above, and the method of fixing the spacer to the first base layer or the method of forming the column spacer also follows the already-described method or the known method.

On the other hand, here, in the case where the polarization layer is an active polarization layer, the manufacturing method may comprise steps of forming a polarization layer by disposing oppositely a third base layer on which a spacer is fixed or a column spacer is formed on one surface and a second base layer so that a light modulating material exists between the third and fourth base layers and the spacer of the third base layer faces the fourth base layer; and forming the polarization layer on one surface of the transmittance-variable layer such that the third base layer of the third base layer and the fourth base layer is disposed closer to the first base layer. In this case, the spacer may not be formed on the fourth base layer.

The details of the polarization layer, the third and fourth base layers and the light modulating material are the same as described above, and the method of fixing the spacer to the third base layer or the method of forming the column spacer also follows the already-described method or the known method.

The present application relates to a use of the transmittance-variable device. The transmittance-variable device of the present application can be applied to all devices to which the transmittance variability can be applied. For example, the transmittance-variable device of the present application can be applied to sunroofs, goggles, sunglasses, helmets or the like to provide transmittance-variable devices. As long as the transmittance-variable devices comprise the transmittance-variable device of the present application, other parts, structures, and the like are not particularly limited, and all contents well known in this field can be appropriately applied.

Advantageous Effects

In order to solve the above-mentioned problems, the present application can provide a transmittance-variable device which does not generate scratches and light leakage when a polarization layer is positioned on the other surface of a base layer to which a spacer is fixed.

The present application can provide a transmittance-variable device that there is no need to consider physical properties such as scratch resistance of an alignment film, it is possible to suppress defects due to the flow of upper/lower base materials generated under heat-resistant conditions and the process margin increases in a cell manufacturing process.

MODE FOR INVENTION

Hereinafter, the present application will be specifically described by way of examples according to the present application and comparative examples that do not comply with the present application, but the scope of the present application is not limited by the following examples.

1. Evaluation of Electro-Optical Characteristics (Hazemeter Measurement)

For Examples or Comparative Examples, it was evaluated whether or not uniform driving was performed. Specifically, the transmittance and the haze values of the elements of Examples and Comparative Examples were measured using a hazemeter (NDH-5000SP) instrument, and it was evaluated whether the uniform driving was performed on the basis of them.

Example 1

Manufacturing of Upper Substrate

The upper substrate was manufactured by forming an alignment film on a COP (cycloolefin polymer) film, on one surface of which an ITO (indium tin oxide) electrode layer was formed. The alignment film was formed by using an alignment film forming material in which a polyimide-based alignment film forming substance (Nissan, SE-7492) was dispersed in cyclopentanone and ethylene glycol as a solvent at a concentration of about 2 weight %. The alignment film forming material was coated by a bar coating method so that the final thickness of the alignment film was about 200 nm. Subsequently, the alignment film was formed by maintaining the substrate in an oven at about 130° C. for about 20 minutes to perform a baking and imidizing process.

Manufacturing of Lower Substrate

The lower substrate was manufactured in the same manner as in the upper substrate. However, at the time of producing the lower substrate, ball spacers having a diameter of 10 μm were applied together and fixed. Specifically, an alignment film forming material formed by mixing the ball spacers with the alignment film composition so that the same alignment film composition and the ball spacers had a weight ratio of 1:2 (alignment film composition: ball spacers) was coated by a bar coating method so that the final thickness of the alignment film was about 60 nm and the area ratio of the spacers was 2% or so. Subsequently, the alignment film to which the spacer were fixed was formed by holding the substrate in an oven at about 130° C. for about 20 minutes to perform a baking and imidizing process.

Manufacturing of Optical Device

A cell was manufactured by applying a light modulating material (a mixture of MAT-16-969 (ne: 1.5463, no: 1.4757, ε∥: 7.4, ε⊥: 3.2, TNI: 85° C., Δn: 0.0706, Δε: 4.2) liquid crystals from Merck and an anisotropic dye (BASF, X12)) on the lower substrate, and then laminating the upper substrate thereto to contact the ball spacers. Thereafter, a polarizing plate was laminated on the other surface of the lower substrate to which the ball spacers were fixed, thereby manufacturing a cell.

Example 2

The upper and lower substrates were manufactured in the same manner as in Example 1, respectively, except that column spacers were used instead of the ball spacers.

A photo-curable resin was coated to a thickness of 10 μm, irradiated with ultraviolet rays at an intensity of about 300 mW/cm² using a film mask having an opening area ratio of 2% and cured, and then etched to form the column spacers.

Using the upper and lower substrates thus manufactured, a transmittance-variable device was manufactured in the same manner as in Example 1.

Example 3

The upper and lower substrates were manufactured in the same manner as in Example 1, respectively, except that the upper and lower substrates were each manufactured in duplicate.

A transmittance-variable device was manufactured from the upper and lower substrates thus manufactured in the same manner as in Example 1, but it was manufactured to have a double cell structure by laminating the lower substrates laminated with the ball spacers together.

Example 4

The upper and lower substrates were manufactured in the same manner as in Example 1, respectively, except that the upper and lower substrates were each manufactured in duplicate and the column spacers were used instead of the ball spacers.

A transmittance-variable device was manufactured from the upper and lower substrates thus manufactured in the same manner as in Example 1, but it was manufactured to have a double cell structure by laminating the lower substrates laminated with the column spacers together.

Comparative Example 1

A transmittance-variable device was manufactured by the same manner as in Example 1, except that the polarizing plate was laminated on a surface of the upper substrate opposite to a surface on which the alignment film in which the ball spacers were not embedded was formed.

Test Example

The light leakage, transmittance and hazes in the transmittance-variable film prepared in each of Examples and Comparative Examples were confirmed. The relevant light leakage was confirmed at a loupe magnification of 10 times and a microscope magnification of 100 times, respectively.

Figure 2:
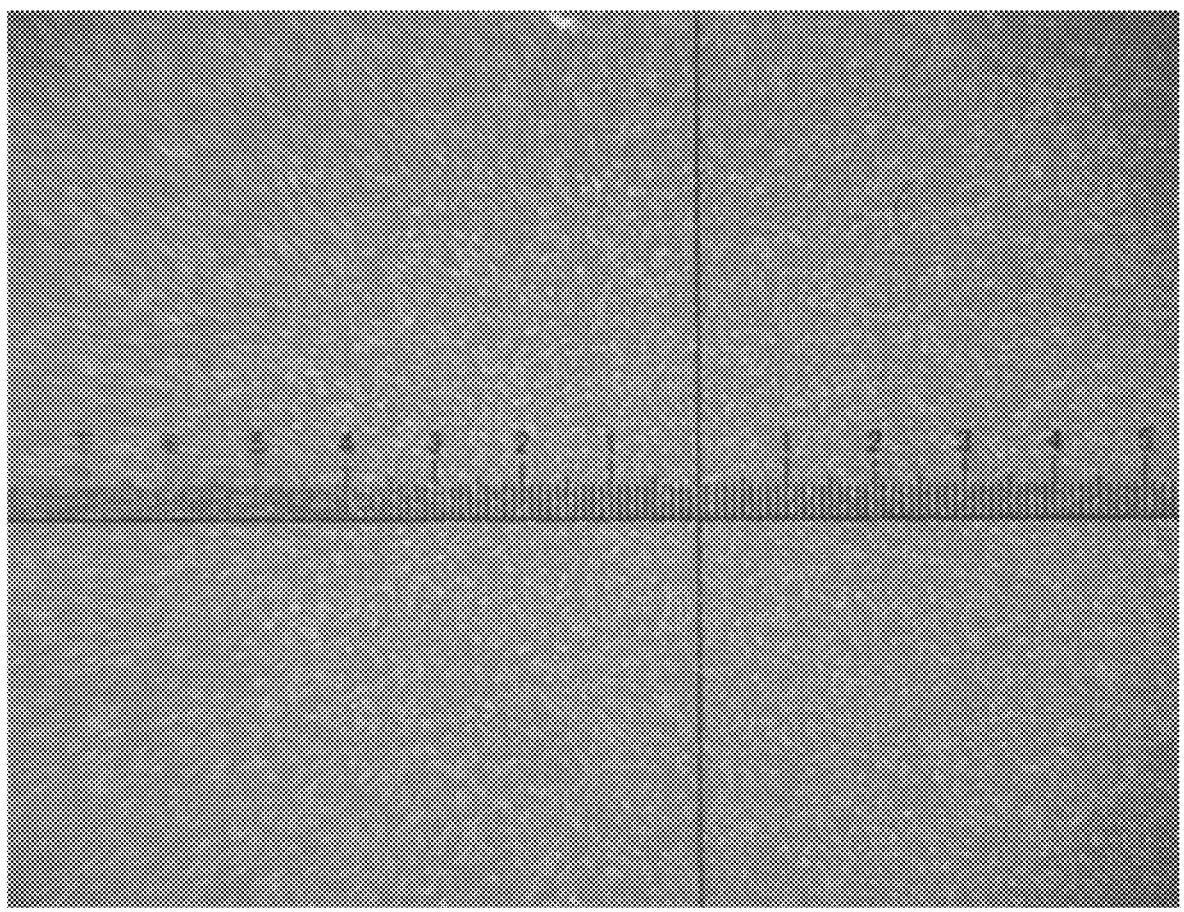
FIG. 2 is a loupe image according to Example 1 of the present application.
Figure 3:
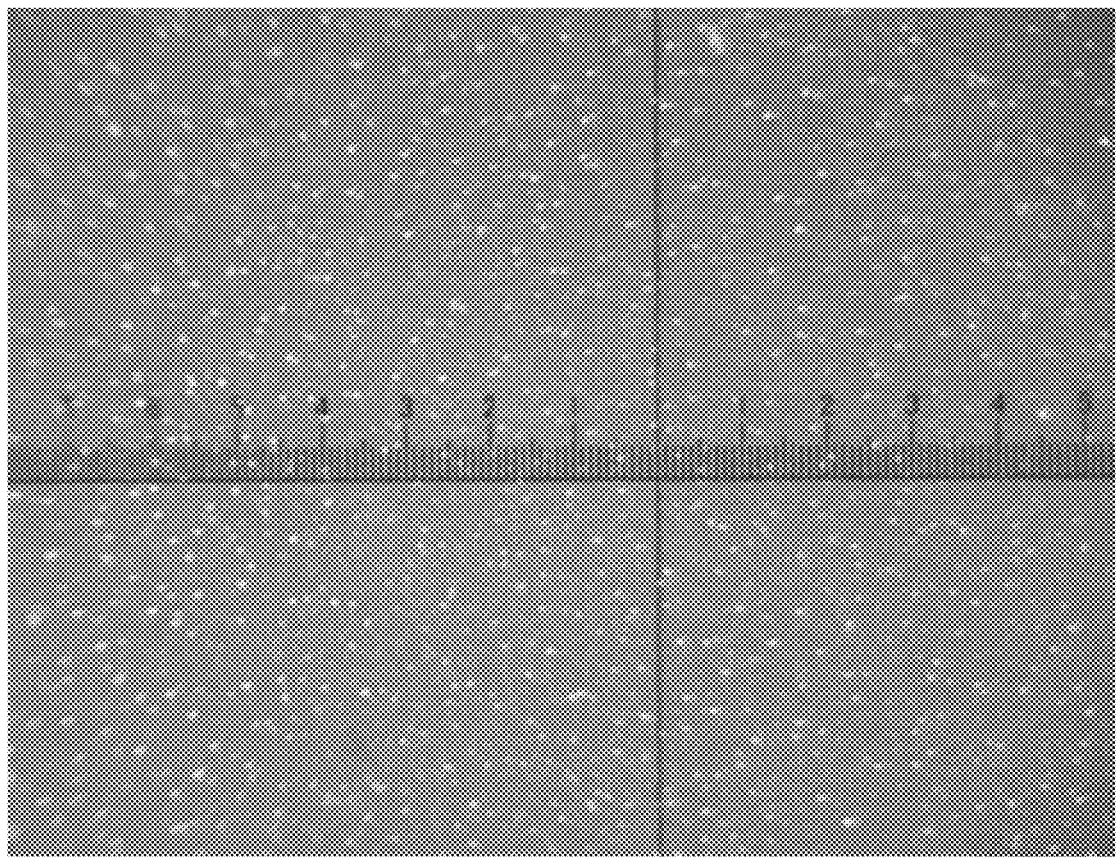
FIG. 3 is a loupe image according to Comparative Example 1 of the present application.
Figure 4:
FIG. 4 is an image observed with an optical microscope, according to Example 1 of the present application.
Figure 5:
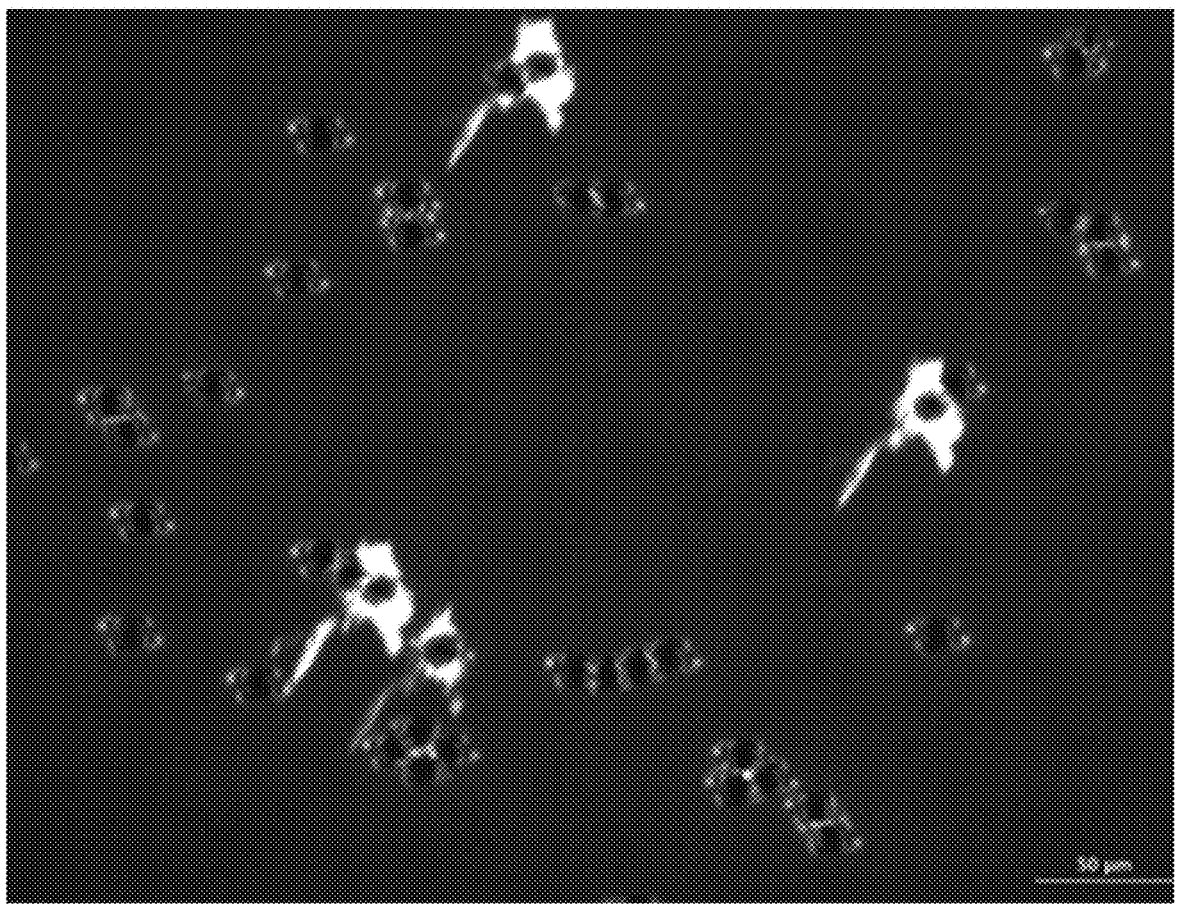
FIG. 5 is an image observed with an optical microscope, according to Comparative Example 1 of the present application.

FIGS. 2 to 3 as attached are loupe images of Example 1 according to the present application and Comparative Example 1, and FIGS. 4 to 5 are images observed with an optical microscope according to Example 1 and Comparative Example 1 of the present application.

It was confirmed from FIGS. 2 to 5 that in the case of Example 1, the scratches and light leakage on the alignment film formed on the upper substrate due to the spacers were not generated, but in the case of Comparative Example 1, the scratches on the alignment film formed on the upper substrate due to the spacers occurred.

In addition, the transmittance of Example 1 and the transmittance of Comparative Example 1 measured using the hazemeter were 0.66% and 0.68%, respectively, and the hazes measured for Example 1 and Comparative Example 1 were 12.5 and 18.7, respectively, whereby it was confirmed that the haze was higher in Comparative Example 1 than in Example 1. It can be seen that scratches and light leakage have been generated on the alignment film of the upper substrate due to the spacers.

In Example 1 and Comparative Example 1 of the present application, only the results of manufacturing a transmittance-variable film using ball spacers only in a single cell were shown, but when manufactured in Examples 2 to 4, the same results as in Example 1 of the present application were confirmed.

The invention claimed is:

1. A transmittance-variable device, comprising:
   a first polarization layer; and
   a transmittance-variable layer disposed on the polarization layer,
   wherein the transmittance-variable layer comprises:
     a first base layer disposed on the polarization layer;
     a first alignment film disposed on a surface of the first based layer opposite to the polarization layer,
     a first spacer fixed on the surface of the first base layer, wherein the first spacer is embedded in the first alignment film;
     a second base layer facing the first base layer;
     a second alignment film disposed on a first surface of the second base layer,
     wherein the second base layer and second alignment film are spaced apart from the first base layer by the first spacer, wherein the first spacer maintains a first gap between the first and second base layers, and wherein the first spacer is not embedded in the second alignment film; and
     a first light modulating material disposed in the first gap,
     wherein a second polarizing layer is not disposed on a second surface of the second base layer opposite to the first surface on which the second alignment film is disposed.

2. The transmittance-variable device according to claim 1, wherein the first polarization layer is a passive polarization layer.

3. The transmittance-variable device according to claim 1, wherein the first polarization layer is an active polarization layer.

4. The transmittance-variable device according to claim 3, wherein the active polarization layer, comprises:
   a third base layer;
   a second spacer; and
   a fourth base layer facing the third base layer and spaced apart from the third base layer by the second spacer, wherein the second spacer maintains a second gap between the third and fourth base layers; and
   a second light modulating material disposed in the gap.

5. The transmittance-variable device according to claim 4, wherein the second spacer is fixed on the third base layer, and
   wherein the third base layer is disposed to be closer to the first base layer than the fourth base layer.

6. The transmittance-variable device according to claim 1, wherein the first and second base layers are a plastic film.

7. The transmittance-variable device according to claim 1, wherein the first spacer is a ball spacer.

8. The transmittance-variable device according to claim 1, wherein the spacer has a size in a range from 2 μm to 100 μm.

9. The transmittance-variable device according to claim 1, wherein the first spacer comprises one or more selected from the group consisting of a carbon material, a metal material, an oxide material, and a composite material thereof.

10. The transmittance-variable device according to claim 1, wherein the first alignment film is a photo-alignment film or a rubbing alignment film.

11. The transmittance-variable device according to claim 1, wherein the first light modulating material comprises a liquid crystal compound and a dichroic dye.

12. The transmittance-variable device according to claim 4, wherein the second light modulating material comprises a liquid crystal compound and a dichroic dye.

13. A sunroof, comprising:
the transmittance-variable device of claim 1.

14. The transmittance-variable device according to claim 1, wherein the first spacer is a column spacer formed on the surface of the first base layer.

15. The transmittance-variable device according to claim 5, wherein the second spacer is a column spacer formed on the surface of the third base layer.

16. The transmittance-variable device according to claim 1, wherein the first polarization layer has a function of transmitting a light that vibrates in one direction from an incident light that vibrates in various directions and shielding a light that vibrates in the other directions.

* * * * *